Nov. 4, 1958
J. H. COLEMAN
2,859,361
METHOD AND MEANS FOR COLLECTING ELECTRICAL
ENERGY OF NUCLEAR REACTIONS
Filed July 5, 1951
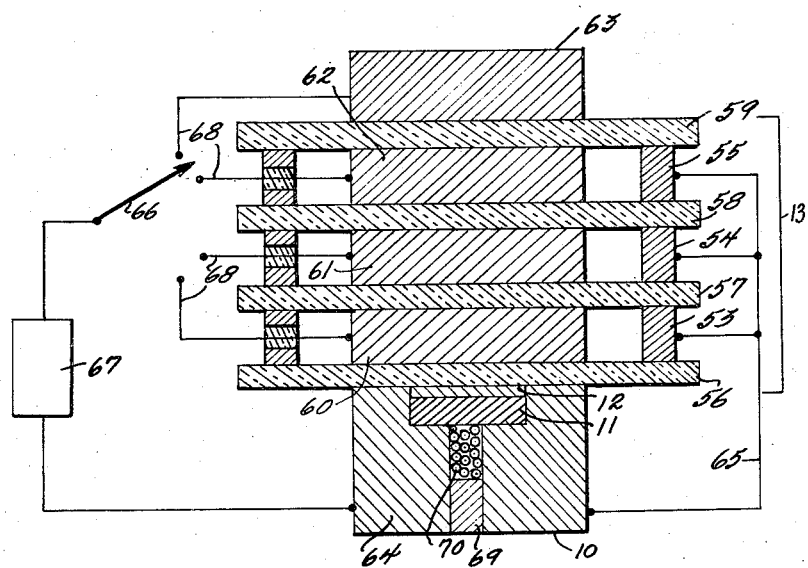
INVENTOR
JOHN H. COLEMAN
ATTORNEYS United States Patent Office 2,859,361
Patented Nov. 4, 1958

2,859,361

METHOD AND MEANS FOR COLLECTING ELECTRICAL ENERGY OF NUCLEAR REACTIONS

John H. Coleman, Palm Beach, Fla., assignor to Radiation Research Corporation, West Palm Beach, Fla., a corporation of Florida Application July 5, 1951, Serial No. 235,182

3 Claims. (Cl. 310—3)

This invention relates generally to nuclear electric generators and particularly to unique methods of and means for converting the kinetic energy of the disintegration products of nuclear reactions into useful electrical energy.

It is well known that nuclear reactions can occur as a spontaneous change of nuclear energy levels such as radioactivity, or can occur as an induced change of nuclear energy levels by an atomic projectile such as nuclear fission induced by neutron bombardment. In both basic reactions the characteristics of the resulting disintegration products vary both with the material involved in the reaction and with the particular nuclear product emitted. Using the previous example, a radioactive reaction is followed by the emission of alpha, beta or gamma radiation depending on the isotope involved. In the second place, the alpha, beta and gamma radiation itself varies in size, charge and interaction with matter as determined by the range. For example, alpha radiation is emitted with a discrete energy characteristic of the particular isotope involved and has a short range in matter. For example, a one million volt alpha particle will penetrate only 8 milligrams per square centimeter of aluminum. On the other hand, beta radiation is emitted with energies ranging from zero to a maximum energy depending on the particular isotope and has a longer range. A one million volt beta particle will penetrate 388 milligrams per square centimeter of aluminum.

It is also known that in the passage of nuclear radiation through insulators that the conductivity is increased by collision with orbital electrons which then fall into the conduction band. The conductivity depends on both the composition of the insulator and the type of nuclear radiation which are interacting.

A device employing a multi-element structure to extract a large fraction of energy from reactions which have inhomogeneous energy distribution much as beta emission is disclosed in U. S. Patent No. 2,555,116, issued on May 29, 1951. That device, however, has the disadvantages of requiring a high vacuum in the first place and having to operate at high potentials in the second place. The present invention, on the other hand, does not require a vacuum and provides a means of converting the energy of the primary radiation into current at a relatively low potential.

The present invention also provides an improvement over that disclosed in application Serial No. 170,877, filed June 28, 1950, in increasing the efficiency of conversion into electrical energy of the inhomogeneous energy type of nuclear radiations by the use of a multiple array of collecting electrodes.

An object of the present invention is to provide a method of utilizing the energy of nuclear radiation with discrete energy distribution.

A further object of the invention is the reduction of current flow between adjacent multiple collecting electrodes in a nuclear electric generator.

Other and further objects of this invention will be apparent to those skilled in the art to which it relates from the following specification, claims and drawing in which briefly:

The drawing is an illustration of an embodiment of the invention in a nuclear electric generator having a source of nuclear radiation, a number of electrodes spaced from the source and from each other by means of solid dielectrics, and in which at least one electrode is provided to guard against leakage from one collecting electrode across the surface of a dielectric to another electrode.

In the drawing there is shown a source 10 that contains the nuclear reaction which consists, in this case, of a radio-active isotope 11, such as strontium 90 emitting beta particles through the thin disc 12, such as, .002" aluminum, into the collecting assembly 13. If desired, a source of mixed nuclear radiation may be provided by inserting a gamma-producing isotope or mixed fission products into cavity 70 between source 11 and plug 69 to be used in conjunction with the beta emitting source 11. The cylindrical block 64 holds the isotope 11 in a cylindrical cavity. This block 64 is made of metal, such as lead or copper and is sufficiently thick to absorb any radiation that is not emitted in the direction of the collecting assembly 13. The major portion of the emitted radiation from the radio-active isotope 11 is collected by the discs 60, 61, 62 and 63, of material such as .004" aluminum, which are supported and insulated from one another by the dielectric members 56, 57, 58 and 59 which are also in the form of discs and are composed of any suitable material known in the art. The lowest energy particles are collected by the disc 60, while the high energy particles are collected by the electrodes 61, 62, and 63, respectively. The dielectric members in this embodiment of the invention, as in the others to be described hereinafter, are composed of a substantially continuous dielectric, or dielectric which is free from holes or perforations except for such as result from mechanical imperfections. The disclosure and claims are to be read and interpreted with this understanding.

It is a feature of the invention that one or more guard electrodes 53, 54, and 55, in the form of annular rings, are placed in contact with surfaces of the dielectric sheets 56, 57, 58 or 59 to guard against the flow of current between the electrodes 60, 61 or 62 or the metal member 64 which houses the source 11 of radiation. The guard electrodes or guard rings 53, 54 and 55 are grounded to the source 11 by lead 65 and may be used between any desired electrodes which pass radiation current. It will be understood that the invention has particular utility where the individual thicknesses of dielectrics 56, 57, 58 and 59, along with the energy distribution of the radiation from source 11 is such that the potential produced on collector 61 relative to collector 60 is lower than the potential difference produced between collector 60 and metal member 64, etc., such a condition may occur, for example, if a beta emitting source is employed along with dielectric spacers of equal thickness, and collector electrodes of equal thickness.

Any of the electrodes 60, 61, 62 and 63 can be connected by a switch 66 to the load 67 by leads 68 which pass through insulated holes in the guard rings 53, 54 and 55.

The thickness of the collecting electrodes 60, 61 and 62 can be adjusted to collect a particular amount of radiation current and the position of the switch 66 can be calibrated in terms of current.

What I claim is as follows:

1. Apparatus for converting the kinetic energy of the disintegration products of nuclear reactions into useful electrical energy comprising a source of radioactive material providing charged particle emission, a collector electrode disposed adjacent to said source, solid dielectric means for spacing said electrode from said source, a guard member surrounding said electrode and insulated therefrom, means for supporting said source and permitting motion of charged particles emitted by said source toward said electrode, an electrical connection between said guard member and said source, and means for connecting said source and said electrode to a load.

2. Apparatus for primarily generating electrical energy including a source of radioactive material providing charged particle emission, a plurality of electrodes disposed in a region adjacent to said source, solid dielectric means for spacing said electrodes and for receiving an electrical charge from the charged particles emitted by said source, a metallic member for supporting said source and for permitting motion of charged particles from said source toward said electrodes and said dielectric, guard rings positioned around said electrodes and spaced therefrom, connections for connecting said guard rings to said metallic member, a load, and connections for connecting a load to selected ones of said electrodes.

3. Apparatus for generating electrical energy comprising a nuclear reaction source emitting disintegration products, a plurality of electrodes exposed to said products for deriving an electrical charge, means for insulating said source from said electrodes, said insulating means comprising a substantially continuous dielectric, a metallic member supporting said source and permitting motion of said products from said source toward said electrodes, guard members surrounding said electrodes and insulated therefrom, a common return leading from said guard members, said guard members electrically conducting any leaking portion of said charge to said common return, and means for connecting said source and said electrodes to a load.

References Cited in the file of this patent

UNITED STATES PATENTS

| | | |
|---|---|---|
| 2,493,935 | Wiegand et al. | Jan. 10, 1950 |
| 2,517,120 | Linder | Aug. 1, 1950 |
| 2,631,246 | Christian | Mar. 10, 1953 |
| 2,640,953 | Rossi | June 2, 1953 |
| 2,728,867 | Wilson | Dec. 27, 1955 |

FOREIGN PATENTS

| | | |
|---|---|---|
| 34,479 | France | Jan. 26, 1929 |

(Addition to French Patent No. 646,761)